(12) United States Patent
Kurosaki et al.

(10) Patent No.: US 12,123,484 B2
(45) Date of Patent: Oct. 22, 2024

(54) POWER TRANSMISSION DEVICE

(71) Applicant: TOYOTA JIDOSHA KABUSHIKI KAISHA, Toyota (JP)

(72) Inventors: Shin Kurosaki, Toki (JP); Hiroki Monji, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/504,458

(22) Filed: Nov. 8, 2023

(65) Prior Publication Data
US 2024/0263691 A1 Aug. 8, 2024

(30) Foreign Application Priority Data
Feb. 6, 2023 (JP) ................................. 2023-016149

(51) Int. Cl.
*F16H 37/08* (2006.01)
*F16H 48/08* (2006.01)
(Continued)

(52) U.S. Cl.
CPC ........... *F16H 37/082* (2013.01); *F16H 48/08* (2013.01); *F16H 48/10* (2013.01); *F16H 57/037* (2013.01); *B60K 6/365* (2013.01); *B60K 2007/0092* (2013.01); *B60K 17/16* (2013.01); *F16H 48/06* (2013.01); *F16H 2048/085* (2013.01); *F16H 2048/087* (2013.01); *F16H 2057/02034* (2013.01); *F16H 2057/02052* (2013.01)

(58) Field of Classification Search
CPC ........ F16H 37/082; F16H 48/08; F16H 48/10; F16H 57/037; F16H 48/06; F16H 2048/085; F16H 2048/087; F16H 2057/02034; F16H 2057/02052; B60K 6/365; B60K 17/16; B60K 2007/0092
See application file for complete search history.

(56) References Cited

U.S. PATENT DOCUMENTS 6,074,321 A    6/2000  Maeda et al.
8,157,693 B2 *  4/2012  Waksmundzki ........ F16H 48/08
                                              475/248
9,657,825 B2 *  5/2017  Ohmura ............... B60K 17/165

FOREIGN PATENT DOCUMENTS

CN       113175518 A  *  7/2021  ......... F16H 57/0412
JP       H08-042656 A     2/1996
(Continued)

*Primary Examiner* — Justin Holmes
(74) *Attorney, Agent, or Firm* — SoraIP, Inc.

(57) ABSTRACT

The power transmission device includes a speed reducer and a differential. The speed reducer includes a sun gear fixed to a hollow input shaft, stepped pinions, first and second ring gears. The stepped pinion has input and output gears, with the input gear engaging the sun gear. A first ring gear is fixed to a housing and engages the input gear. The second ring gear engages the output gear. The differential has a differential housing and first and second output shafts. The differential housing is fixed to the second ring gear. The first and second output shafts are arranged concentrically with the input shaft and extend in opposite directions from the differential housing. One of the first output shaft and the second output shaft passes through the inside of the input shaft. The differential housing is positioned to be surrounded by the output gears of the stepped pinions.

2 Claims, 4 Drawing Sheets

(51) Int. Cl.
*F16H 48/10* (2012.01)
*F16H 57/037* (2012.01)
*B60K 6/365* (2007.10)
*B60K 7/00* (2006.01)
*B60K 17/16* (2006.01)
*F16H 48/06* (2006.01)
*F16H 57/02* (2012.01)

(56) References Cited

FOREIGN PATENT DOCUMENTS

| | | | |
|---|---|---|---|
| JP | H11-166609 A | | 6/1999 |
| JP | 2016-168974 A | | 9/2016 |
| JP | 2021095952 A | * | 6/2021 |
| JP | 2021134902 A | * | 9/2021 |
| JP | 2021-173389 A | | 11/2021 |
| JP | 7002391 B2 | | 2/2022 |
| JP | 2022-074169 A | | 5/2022 |

* cited by examiner

POWER TRANSMISSION DEVICE

CROSS-REFERENCE TO RELATED APPLICATION

This application claims priority to Japanese Patent Application No. 2023-016149 filed on Feb. 6, 2023, incorporated herein by reference in its entirety.

BACKGROUND

1. Technical Field

The technology disclosed in this specification relates to a power transmission device that combines a speed reducer and a differential.

2. Description of Related Art

Japanese Unexamined Patent Application Publication No. 2022-74169 (JP 2022-74169 A) discloses a power transmission device that combines a speed reducer and a differential. The speed reducer includes a hollow input shaft, a sun gear connected to the input shaft, a plurality of stepped pinions that engages with the sun gear, a carrier that rotatably supports the stepped pinions, and a ring gear that is fixed to the case of the speed reducer.

The stepped pinions each include a large diameter gear and a small diameter gear. The large diameter gear and the small diameter gear are coaxial and aligned in the axial direction of the input shaft. The large diameter gear engages with the sun gear and the small diameter gear engages with the ring gear. The differential includes a differential case and a pair of drive shafts extending from the differential case. The differential case is fixed to the carrier and rotates together with the carrier. The drive shafts are arranged coaxially with the input shaft, with one of the drive shafts passing through the hollow input shaft. The differential uses bevel gears to achieve relative rotation of the drive shafts. The differential case includes a support portion that supports the drive shaft, and the support portion is inserted into the inner circumference of the input shaft. With the power transmission device of JP 2022-74169 A, it is possible to shorten the length in the input shaft direction.

It should be noted that an example of the differential employed in the power transmission device disclosed in the present specification does not use bevel gears. The details of such a differential are given in Japanese Unexamined Patent Application Publication No. 2021-173389 (JP 2021-173389 A).

SUMMARY

In the power transmission device of JP 2022-74169 A, the speed reduction ratio depends on the gear ratio between the large diameter gear and the small diameter gear of the stepped pinion. Therefore, a large reduction ratio cannot be obtained. The present specification provides a power transmission device that allows reducing the length in the input shaft direction and at the same time obtaining a large reduction ratio.

The power transmission disclosed in the present specification is a device that combines a speed reducer and a differential. The speed reducer includes a hollow input shaft, a sun gear, a plurality of stepped pinions, a first ring gear and a second ring gear. The sun gear is provided at one end of the input shaft. The stepped pinions are disposed to surround the sun gear. The stepped pinions each include an input gear with a first number of teeth and an output gear with a second number of teeth different from the first number of teeth. The input gear is engaged with the sun gear. The first ring gear is fixed to a housing of the speed reducer and engaged with the input gear of each of the stepped pinions. The second ring gear is engaged with the output gear of each of the stepped pinions.

The differential includes a differential housing and first and second output shafts. The differential housing is fixed to the second ring gear and rotates together with the second ring gear. The first and second output shafts are disposed coaxially with the input shaft and extend in opposite directions from each other from the differential housing. One of the first output shaft and the second output shaft passes through an inside of the input shaft. The differential housing is positioned such that the differential housing is surrounded by the output gears of the stepped pinions.

In the power transmission device disclosed in the specification, the speed reducer is realized by a paradox planetary gear mechanism, and a large speed reduction ratio can be obtained. Moreover, the differential housing is positioned such that the differential housing is surrounded by the output gears of the stepped pinions. Due to this structural feature, the power transmission device disclosed in the specification has a short length in the input shaft direction.

One aspect of the differential has the following structure. The differential includes a first side gear, a second side gear, a first differential pinion gear, and a second differential pinion gear. The first side gear is fixed to the first output shaft in the differential housing. The second side gear is fixed to the second output shaft in the differential housing. The first differential pinion gear is rotatably supported by the differential housing around an axis parallel to the input shaft, and engaged with the first side gear. The second differential pinion gear is rotatably supported by the differential housing around an axis parallel to the input shaft, and engaged with the second side gear and the first differential pinion gear. With this differential, unlike a differential using bevel gears having a rotation axis perpendicular to the output shaft, the power transmission device can be made compact because the differential is composed only of gears having rotation axes parallel to the input shaft. Such a differential is suitable for disposition inside the stepped pinions of the speed reducer.

The differential housing may include a boss that protrudes concentrically with the input shaft, and the boss is located inside the sun gear. Since part of the differential housing and the sun gear overlap in the axial direction of the input shaft, the length in the input shaft direction can be further shortened.

The power transmission device disclosed in the specification may further include an electric motor, and a rotor of the electric motor may be fixed to the input shaft. This allows the power transmission device, including the electric motor, to be made compact.

Details of the techniques disclosed in the present specification and further modifications will be described in the "DETAILED DESCRIPTION OF EMBODIMENTS" below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
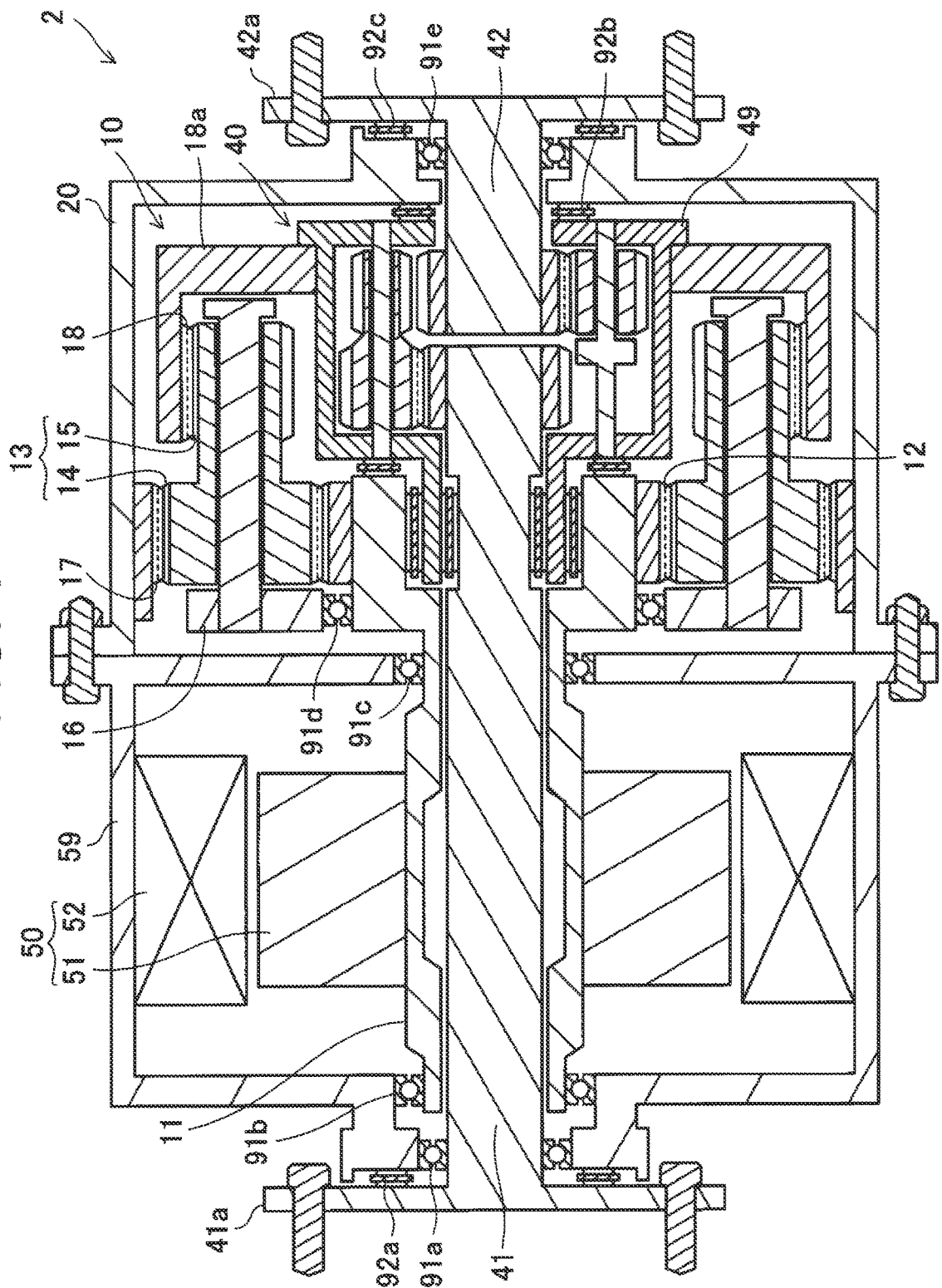
FIG. 1 is a cross-sectional view of a power transmission device of an embodiment.

A power transmission device 2 of an embodiment will be described with reference to the drawings. FIG. 1 shows a cross-sectional view of the power transmission device 2. The power transmission device 2 is composed of a motor 50, a speed reducer 10 and a differential 40. The power transmission device 2 amplifies the torque of the motor 50 and transmits it to a pair of output shafts (first output shaft 41 and second output shaft 42).

The speed reducer 10 will be described. The speed reducer 10 includes a hollow input shaft 11, a sun gear 12, a plurality of stepped pinions 13, a first ring gear 17 and a second ring gear 18. The sun gear 12 is fixed to one end of the input shaft 11. The axial direction of the input shaft may be hereinafter referred to as "longitudinal direction" or "axial direction".

The stepped pinion 13 has an input gear 14 and an output gear 15 that are longitudinally adjacent to each other. The number of teeth of the input gear 14 differs from the number of teeth of the output gear 15. The number of teeth of the output gear 15 is smaller than the fraction of the input gear 14. Also, the diameter of the output gear 15 is shorter than the diameter of the input gear 14. A plurality of stepped pinions 13 are rotatably supported by a carrier 16. The carrier 16 supports the stepped pinions 13 so that the stepped pinions 13 are arranged around the sun gear 12 at equal intervals. The carrier 16 is arranged coaxially with the input shaft 11 and is rotatable around the axis of the input shaft 11. Each stepped pinion 13 can revolve around the sun gear 12 while rotating by being supported by the carrier 16. The carrier 16 is rotatably supported outside the shaft of the sun gear 12 via a ball bearing 91d.

A first ring gear 17 is positioned outside the input gear 14 of the stepped pinion 13. The first ring gear 17 is an internal gear and engages with the input gears 14 of the stepped pinions 13. The first ring gear 17 is fixed to the speed reducer housing 20 and does not rotate.

The second ring gear 18 is arranged coaxially with the input shaft 11. The second ring gear 18 includes a disc 18a and can rotate coaxially with the input shaft 11. The second ring gear 18 is an internal gear and surrounds the output gears 15 of the multiple stepped pinions 13. The second ring gear 18 is engaged with the output gears 15 of the stepped pinions 13.

The number of teeth of the second ring gear 18 is slightly smaller than the number of teeth of the first ring gear 17. When the carrier 16 rotates once, the second ring gear 18 rotates by an angle corresponding to the number of teeth difference from the first ring gear 17. The smaller the difference in the number of teeth between the second ring gear 18 and the first ring gear 17, the smaller the rotation angle of the second ring gear 18 when the carrier 16 rotates once. That is, the speed reducer 10 can obtain a larger speed reduction ratio (larger torque amplification ratio) as the difference in the number of teeth between the second ring gear 18 and the first ring gear 17 is smaller.

In the speed reducer 10 of FIG. 1, the sun gear 12 corresponds to the input component, and the second ring gear 18 corresponds to the output component. The speed reducer 10 in FIG. 1 is called a 3K type paradox planetary gear mechanism, and is known to provide a large torque amplification ratio.

The motor 50 will be explained. The motor 50 has a rotor 51 and a stator 52. The rotor 51 is fixed to the input shaft 11. Stator 52 is fixed to motor housing 59. When the motor 50 is energized, the input shaft 11 rotates together with the rotor 51. The input shaft 11 is rotatably supported by the motor housing 59 by ball bearings 91b and 91c.

The differential 40 will be explained. The differential 40 includes a differential housing 49 that houses gears. The differential housing 49 is fixed to the disc 18a of the second ring gear 18. A differential housing 49 is positioned at the center of the second ring gear 18. The differential housing 49 rotates together with the second ring gear 18.

The differential 40 has a pair of output shafts (a first output shaft 41 and a second output shaft 42). The first output shaft 41 and the second output shaft 42 are arranged coaxially with the input shaft 11 and extend from the differential housing 49 in opposite directions. The first output shaft 41 passes through the inside of the hollow input shaft 11. The first output shaft 41 is rotatably supported by the motor housing 59 with a roller bearing 92a and a ball bearing 91a. The second output shaft 42 is rotatably supported by the speed reducer housing 20 with a roller bearing 92c and a ball bearing 91e. A hub 41a is provided at one end of the first output shaft 41, and one axle is fixed to the hub 41a. A hub 42a is provided at one end of the second output shaft 42, and the other axle is fixed to the hub 42a. The power transmission device 2 is a device in which a main shaft (input shaft 11) and axles (first output shaft 41 and second output shaft 42) of a motor 50 are arranged coaxially.

The differential housing 49 is positioned so as to be surrounded by the output gears 15 of the stepped pinions 13. In other words, the differential housing 49 is positioned inside the second ring gear 18. In other words, the differential housing 49, the output gear 15, and the second ring gear 18 overlap in the axial direction. With this structure, the power transmission device 2 has a short axial length of the input shaft 11.

Figure 2:
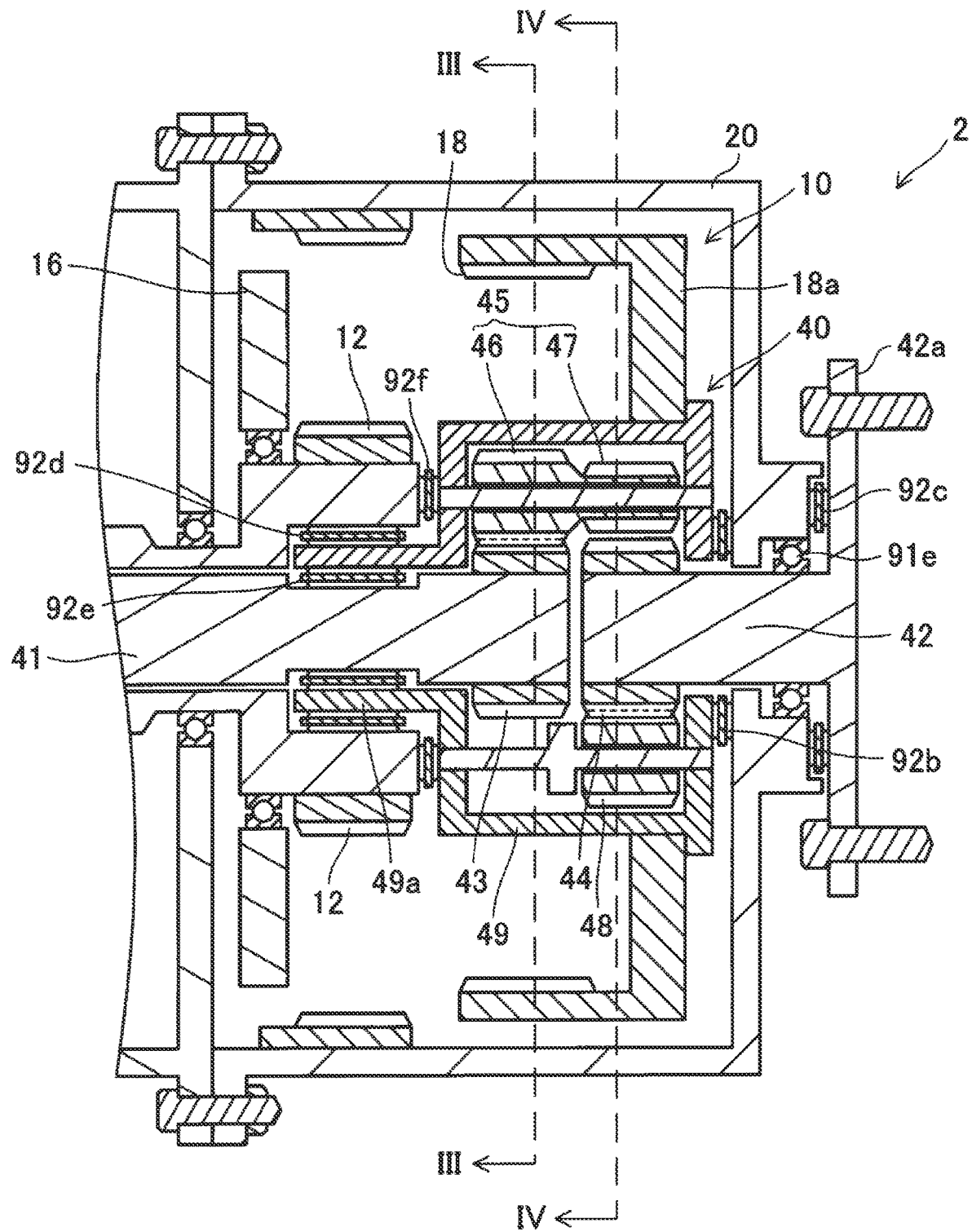
FIG. 2 is a cross-sectional view of the power transmission device of the embodiment (cross-sectional view with some parts omitted)
Figure 3:
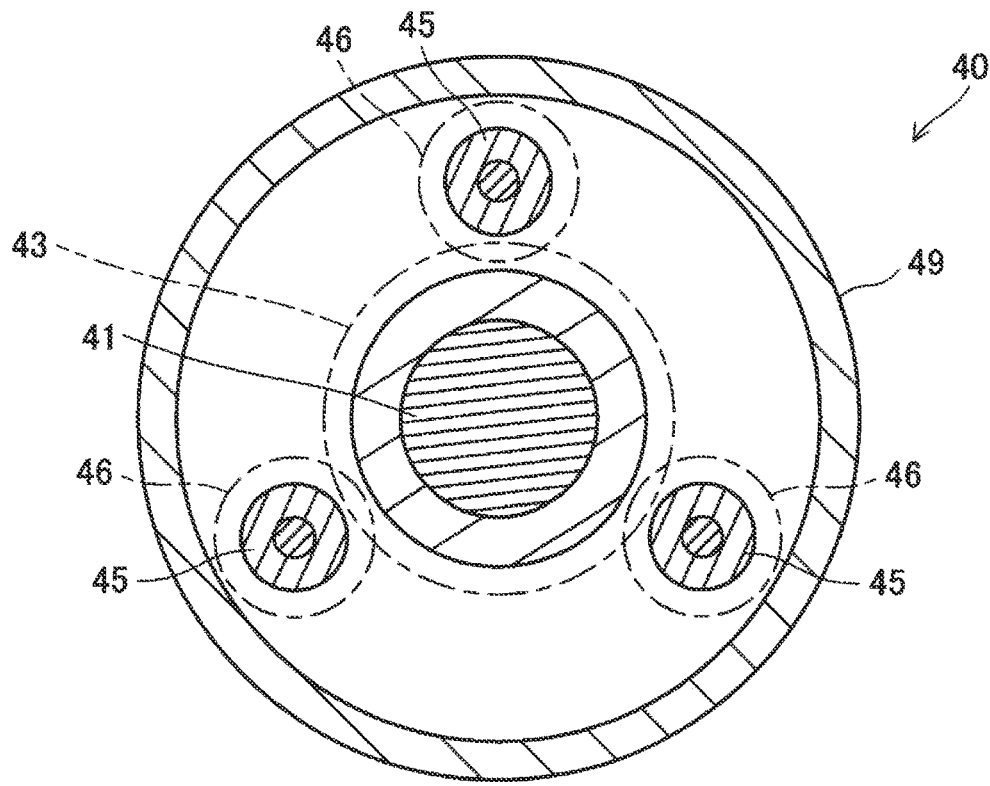
FIG. 3 is a cross-sectional view taken along line III-III in FIG. 2.
Figure 4:
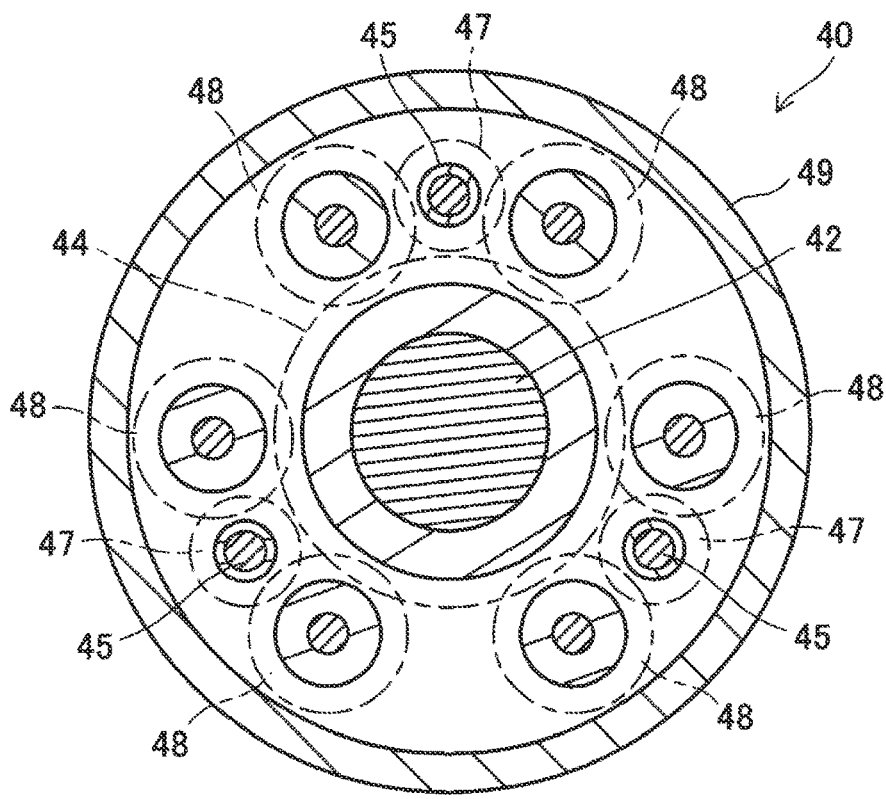
FIG. 4 is a cross-sectional view cut along the IV-IV line of FIG. 2.

From now on, the internal structure of the differential 40 will be described with reference to FIGS. 2-4 along with FIG. 1. FIG. 2 is a cross-sectional view of the motor 50 and a part of the speed reducer 10 omitted from FIG. 1. In FIG. 2, the reference numerals of the parts of the differential 40 are shown in blank areas where the parts are omitted. FIG. 3 shows a cross section along line III-III of FIG. 2, and FIG. 4 shows a cross section along line IV-IV of FIG. 2. In FIGS. 3 and 4, the tooth row of the gear is simplified by dash-dot lines.

The differential 40 includes a first side gear 43, a second side gear 44, a first differential pinion gear 45 and a second differential pinion gear 48 inside a differential housing 49. The first side gear 43 is fixed to one end of the first output shaft 41, and the second side gear 44 is fixed to one end of the second output shaft 42. The first side gear 43 and the second side gear 44 are adjacent to each other in the axial direction of the input shaft 11.

The first differential pinion gear 45 and the second differential pinion gear 48 are rotatably supported by the differential housing 49 about an axis parallel to the axial direction of the input shaft. The first differential pinion gear 45 overlaps the first side gear 43 and also overlaps the second side gear 44. The first differential pinion gear 45 has a large diameter gear 46 and a small diameter gear 47. The large diameter gear 46 and the small diameter gear 47 are coaxial and aligned in the axial direction. The diameter of the large diameter gear 46 is smaller than the diameter of the small diameter gear 47.

A plurality of large diameter gears 46 are arranged at regular intervals around the first side gear 43 (see FIG. 3). The large diameter gear 46 is engaged with the first side gear 43. The small diameter gear 47 faces the second side gear 44 but does not engage with the second side gear 44. As shown in FIG. 4, second differential pinion gears 48 are arranged on both sides of each small diameter gear 47 when viewed in the axial direction. The second differential pinion gear 48 is engaged with the small diameter gear 47 of the first differential pinion gear 45 and is also engaged with the second side gear 44.

The diameter and number of teeth of the second differential pinion gear 48 are the same as those of the large diameter gear 46 of the first differential pinion gear 45. When the first output shaft 41 rotates in the differential housing 49, the first differential pinion gear 45 and the second differential pinion gear 48 are interlocked, and the second output shaft 42 rotates in the opposite direction.

The differential 40 (differential housing 49) rotates together with the second ring gear 18. Further, the differential 40 generates a rotation difference between the first output shaft 41 and the second output shaft 42 when a difference occurs between the external force resistance applied to the first output shaft 41 and the external force resistance applied to the second output shaft 42. The differential 40 rotates in one direction as a whole while creating a rotational difference between the first output shaft 41 and the second output shaft 42. The differentials shown in FIGS. 2 to 4 are detailed in, for example, JP 2021-173389 A, so please refer to that as well.

The differential housing 49 has a cylindrical boss 49a protruding concentrically with the input shaft 11. The cylindrical boss 49a is hollow, through which the first output shaft 41 passes. A roller bearing 92e is arranged between the outer peripheral surface of the first output shaft 41 and the inner peripheral surface of the cylindrical boss 49a. Also, the cylindrical boss 49a is located inside the sun gear 12. A roller bearing 92 d is arranged between the outer peripheral surface of the cylindrical boss 49a and the inner peripheral surface of the sun gear 12. These structures enable the first output shaft 41, the differential housing 49, and the sun gear 12 to rotate smoothly and independently with high coaxial precision.

Between the shafts of the differential housing 49 and the sun gear 12, a roller bearing 92f is arranged. A roller bearing 92b is arranged between the inner wall of the differential housing 49 and the speed reducer housing 20. The bearing arrangement shown in FIGS. 1 and 2 is an example. Although not shown in the figures, various bearing arrangements are possible. In addition to ball bearings and roller bearings, various types of bearings may be employed.

The differential 40 included in the power transmission device 2 of the embodiment employs differential pinion gears 45 and 48 parallel to the output shafts (the first output shaft 41 and the second output shaft 42), so that the diameter of the differential housing 49 is can be made smaller.

Figure 5:
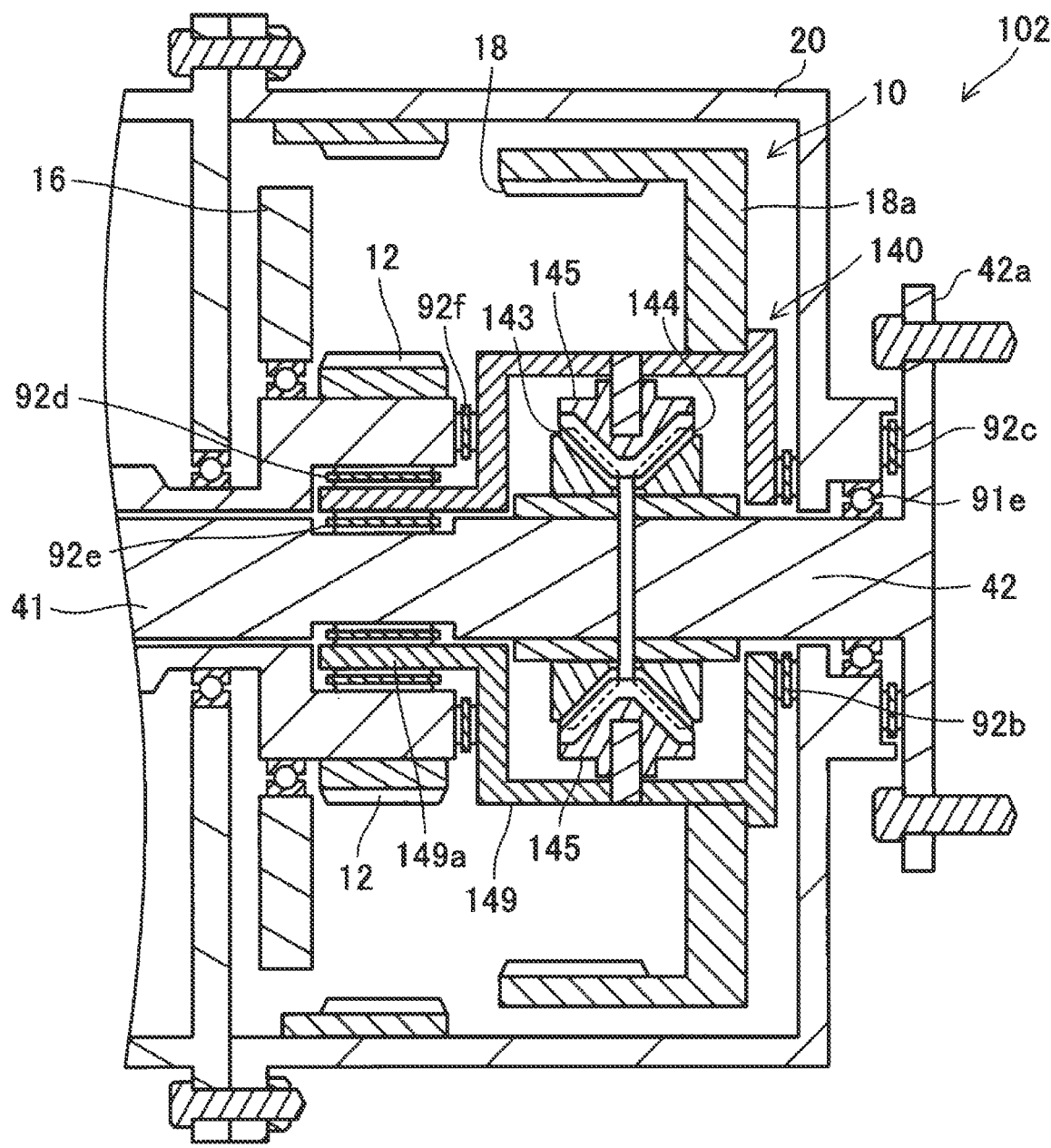
FIG. 5 is a cross-sectional view of a differential gear of a modified example.

The power transmission disclosed herein may employ a conventional differential using bevel gears. FIG. 5 shows a cross-sectional view of a power transmission device 102 incorporating a conventional differential 140. FIG. 5 corresponds to FIG. 2, with the motor 50 and some parts of the speed reducer 10 omitted.

The differential 140 includes a first side bevel gear 143, a second side bevel gear 144 and a plurality of differential bevel gears 145 inside a differential housing 149. The first side bevel gear 143 is fixed to the end of the first output shaft 41 and the second side bevel gear 144 is fixed to the end of the second output shaft 42. The first side bevel gear 143 and the second side bevel gear 144 face each other in the axial direction. A plurality of differential bevel gears 145 are rotatably supported by a differential housing 149 about an axis perpendicular to the axis of the first output shaft 41. A plurality of differential bevel gears 145 are engaged with both the first side bevel gear 143 and the second side bevel gear 144. The structure of the differential 140 of FIG. 5 is well known.

A differential housing 149 of the differential 140 also has a cylindrical boss 149a protruding concentrically with the input shaft 11. The first output shaft 41 passes through the inside of the cylindrical boss 149a. Also, the cylindrical boss 149a is positioned inside the sun gear 12.

As described above, the power transmission device 2, 102 of the embodiment can shorten the length in the input shaft direction and at the same time obtain a large torque amplification ratio.

Points to be noted regarding the technique described in the embodiment will be described. The first ring gear 17 and the second ring gear 18 are internal gears, and the other gears are external gears. The gears may be spur gears, but are preferably helical gears.

The power transmission device disclosed in this specification is suitable for automobiles. In particular, the power transmission device 2, 102 including the motor 50 is suitable for battery electric vehicles.

Although the specific examples have been described in detail above, these are merely examples and do not limit the scope of claims. The techniques described in the claims include various modifications and alternations of the specific example illustrated above. The technical elements described in the present specification or the drawings exhibit technical usefulness alone or in various combinations, and are not limited to the combinations described in the claims at the time of filing. In addition, the techniques illustrated in the present specification or drawings can achieve a plurality of objectives at the same time, and achieving one of the objectives itself has technical usefulness.

What is claimed is:
1. A power transmission device comprising a speed reducer and a differential, wherein:
the speed reducer includes
a hollow input shaft,
a sun gear provided at one end of the input shaft,
a plurality of stepped pinions disposed to surround the sun gear, the stepped pinions each including an input gear with a first number of teeth and an output gear with a second number of teeth different from the first number of teeth, and the input gear being engaged with the sun gear,
a first ring gear fixed to a housing of the speed reducer and engaged with the input gear of each of the stepped pinions, and
a second ring gear engaged with the output gear of each of the stepped pinions;
the differential includes
a differential housing fixed to the second ring gear, a first output shaft and a second output shaft that are disposed coaxially with the input shaft and extend in opposite directions from each other from the differential housing, with one of the first output shaft and the second output shaft passing through an inside of the input shaft, a first side gear fixed to the first output shaft in the differential housing, a second side gear fixed to the second output shaft in the differential housing, a first differential pinion gear rotatably supported by the differential housing around an axis parallel to the input shaft and engaged with the first side gear, and a second differential pinion gear rotatably supported by the differential housing around an axis parallel to the input shaft and engaged with the second side gear and the first differential pinion gear;

the differential housing is positioned such that the differential housing is surrounded by the output gears of the stepped pinions;

the differential housing includes a boss that protrudes concentrically with the input shaft; and the boss is located inside the sun gear.

2. The power transmission device according to claim 1, further comprising an electric motor, wherein a rotor of the electric motor is fixed to the input shaft.

* * * * *